(12) United States Patent
Stein (10) Patent No.: US 9,936,194 B2
(45) Date of Patent: Apr. 3, 2018

(54) ACTIVE SHUTTER HEAD MOUNTED DISPLAY

(71) Applicant: GOOGLE INC., Mountain View, CA (US)

(72) Inventor: Murphy Stein, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 45 days.

(21) Appl. No.: 14/725,607

(22) Filed: May 29, 2015

(65) Prior Publication Data

US 2016/0353098 A1  Dec. 1, 2016

(51) Int. Cl.
*G02B 27/22* (2006.01)
*G02B 27/01* (2006.01)
(Continued)

(52) U.S. Cl.
CPC ....... *H04N 13/0486* (2013.01); *G02B 27/017* (2013.01); *G02B 27/0172* (2013.01); *G02B 27/2264* (2013.01); *G06T 19/006* (2013.01); *H04N 13/0402* (2013.01); *H04N 13/045* (2013.01); *H04N 13/0454* (2013.01); *G02B 27/225* (2013.01)

(58) Field of Classification Search
CPC ..... G06F 3/011; G06F 3/012; H04N 13/0438; H04N 13/0402; H04N 13/0486; H04N 13/0454; G02B 27/0172; G02B 27/017; G02B 27/0179; G02B 27/225; G02B 27/2264; G02B 2027/0178; G02B 2027/0134; G02B 2027/0154; G02B 17/0642

See application file for complete search history.

(56) References Cited

U.S. PATENT DOCUMENTS 5,621,424 A    4/1997  Shimada et al.
5,808,802 A *  9/1998  Hur ................. G02B 27/017
                                               348/E13.022

(Continued)

FOREIGN PATENT DOCUMENTS

GB    2319423 A    5/1998

OTHER PUBLICATIONS

Thurber, PRO 62/082386, "Apparatus for Reducing Motion Blur When Viewing Three Dimensional Content", Nov. 20, 2014.*
(Continued)

*Primary Examiner* — Dismery Mercedes
(74) *Attorney, Agent, or Firm* — Brake Hughes Bellermann LLP (57) ABSTRACT

A head mounted display (HMD) device may include a housing coupled to a frame, and a display disposed in the housing. A first lens and a first active shutter may be disposed along a first optical axis in the housing, and a second lens and a second active shutter may be disposed along a second optical axis in the housing. A controller may alternately switch the display, the first active shutter and the second active shutter between a first mode and a second mode. In the first mode the first active shutter may be activated and the second active shutter may be deactivated. In the second mode the first active shutter may be deactivated and the second active shutter may be activated.

20 Claims, 8 Drawing Sheets

(51) Int. Cl.
*H04N 13/04* (2006.01)
*G06T 19/00* (2011.01)

(56) References Cited

U.S. PATENT DOCUMENTS

| | | | |
|---|---|---|---|
| 6,314,248 B1 * | 11/2001 | Ohmura | G02B 27/017 348/47 |
| 6,388,797 B1 * | 5/2002 | Lipton | G02B 27/2264 348/E13.04 |
| 6,421,109 B1 * | 7/2002 | Popovich | G02B 5/32 348/756 |
| 6,529,331 B2 * | 3/2003 | Massof | G02B 27/017 345/9 |
| 7,616,172 B2 | 11/2009 | Lin et al. | |
| 8,922,724 B2 * | 12/2014 | Ueki | G02B 27/2264 349/13 |
| 9,036,012 B2 * | 5/2015 | Lee | H04N 13/0434 348/54 |
| 9,158,115 B1 * | 10/2015 | Worley | G02B 27/0172 |
| 9,606,363 B2 * | 3/2017 | Zalewski | G06F 3/01 |
| 2009/0322861 A1 | 12/2009 | Jacobs et al. | |
| 2010/0007582 A1 * | 1/2010 | Zalewski | A63F 13/00 345/8 |
| 2010/0079356 A1 * | 4/2010 | Hoellwarth | G02B 27/017 345/8 |
| 2012/0081623 A1 | 4/2012 | Yamaguchi et al. | |
| 2014/0104505 A1 * | 4/2014 | Koenig | G02B 3/0087 349/11 |
| 2014/0354782 A1 * | 12/2014 | Lowry | H04N 13/044 348/49 |
| 2015/0235426 A1 * | 8/2015 | Lyons | G02B 27/0172 345/8 |
| 2015/0348327 A1 * | 12/2015 | Zalewski | G06F 3/01 345/419 |
| 2016/0011422 A1 * | 1/2016 | Thurber | G02B 27/64 345/8 |
| 2016/0025978 A1 * | 1/2016 | Mallinson | G02B 27/0172 345/8 |

OTHER PUBLICATIONS

International Search Report and Written Opinion from corresponding application PCT/US2016/032426, dated Jul. 18, 2016, 8 pages.

* cited by examiner

ACTIVE SHUTTER HEAD MOUNTED DISPLAY

FIELD

This document relates, generally, to a head mounted display device.

BACKGROUND

A head mounted display (HMD) device is a type of mobile electronic device which may be worn by a user, for example, on a head of the user, to view and interact with content displayed on a display of the HMD and output by an audio output device of the HMD. An HMD may be operated in connection with a Virtual Reality (VR) system and/or an Augmented Reality (AR) system to generate an immersive environment to be experienced by the user via the HMD. The immersive environment may include a three-dimensional (3D) display of content generated by the HMD.

SUMMARY

In one aspect, a head mounted display may include a frame, a housing coupled to the frame, a display mounted in the housing, a first lens mounted in the housing, along a first optical axis, a second lens mounted in the housing, along a second optical axis, a first active shutter mounted in the housing, adjacent to the first lens, a second active shutter mounted in the housing, adjacent to the second lens, and a controller configured to alternately switch the display, the first active shutter and the second active shutter between a first mode and a second mode, wherein, in the first mode the first active shutter is activated and the second active shutter is deactivated, and in the second mode the first active shutter is deactivated and the second active shutter is activated.

In another aspect, a method of operating an HMD may include activating a display of the HMD and displaying images on the display, the images displayed on the display being selectively visible through a first active shutter and a first lens aligned along a first optical axis and through a second active shutter and a second lens aligned along a second optical axis, and automatically switching the first active shutter and the second active shutter between a first mode and a second mode based on the images displayed on the display. Automatically switching between the first mode and the second mode may include in the first mode, activating the first active shutter and de-activating the second active shutter as the images are displayed on the display, and in the second mode, de-activating the first active shutter and activating the second active shutter as the images are displayed on the display.

The details of one or more implementations are set forth in the accompanying drawings and the description below. Other features will be apparent from the description and drawings, and from the claims.

DETAILED DESCRIPTION

HMDs may include an image output device, or display, and an audio output device, to generate an immersive virtual experience. The immersive virtual experience may include generating and displaying three dimensional (3D) images, or images perceived to be 3D when viewed by the user based on a configuration of the display and the various optical elements included in the HMD, based on two dimensional (2D) images displayed separately to the right and left eyes of the user on separate displays or portions of the display dedicated to the right and left eyes of the user. A 3D viewing experience may be enhanced by expanding the field of view afforded by the image output device to allow the user to view substantially the entire display with both eyes. Specifically, a 3D viewing experience may be enhanced by expanding the field of view afforded by the image output device to allow the user to view the entirety (or substantially the entirety) of a single display with each eye in an alternating fashion so that both eyes can take advantage of the size of the single display. In other words, rather than a display (for a total of two displays) dedicated to each eye, the single display can span both eyes.

Figure 1A:
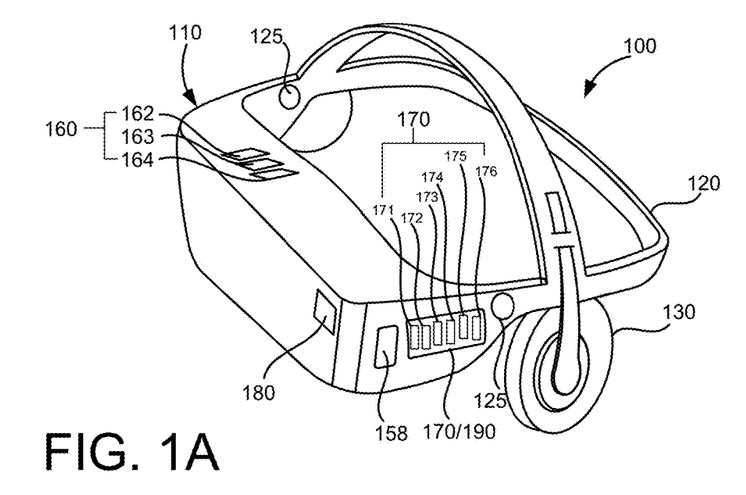
FIGS. 1A-1C illustrate an example implementation of an HMD, in accordance with embodiments as broadly described herein.
Figure 1B:
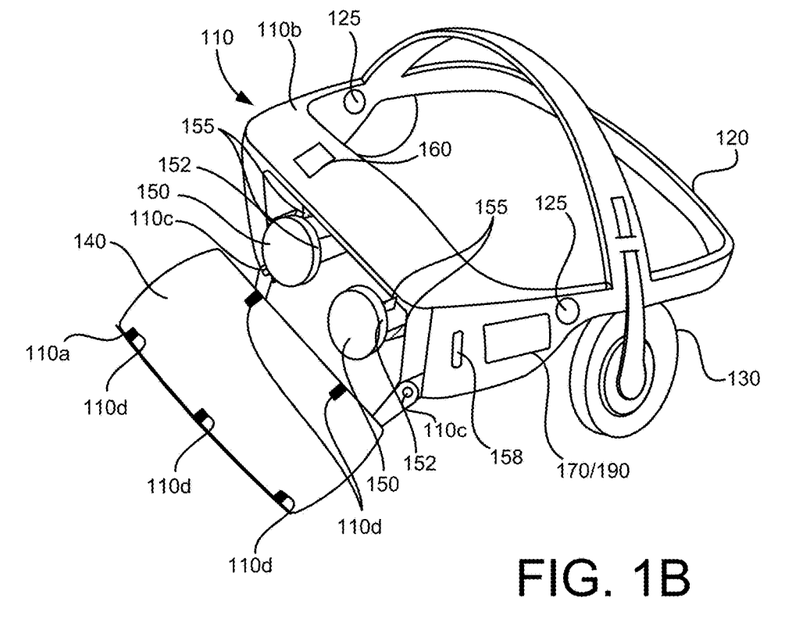
Figure 1C:
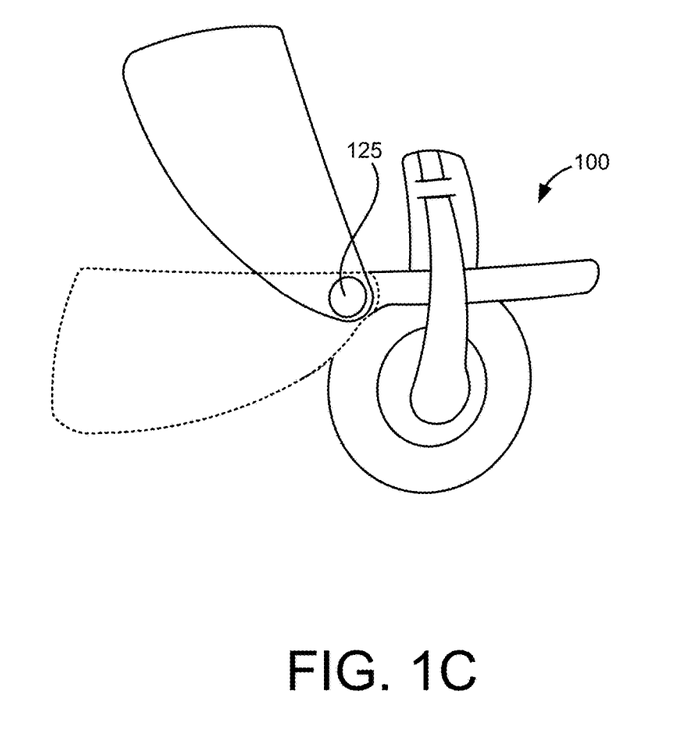

FIGS. 1A and 1B are perspective views and FIG. 1C is a side view of an example HMD which may be worn by a user to generate an immersive virtual experience. The example HMD 100 may include a housing 110 in which optical components may be received. The housing 110 may be coupled, for example, rotatably coupled by hinge shafts 125, to a frame 120 which allows the housing 110 to be mounted or worn on a user's head, and the housing 110 to be moved, or rotated about the hinge shafts 125, out of the user's field of view as shown in FIG. 1C. An audio output device 130 may also coupled to the frame 120, and may include, for example, speakers mounted in headphones and coupled on the frame 120.

In FIG. 1B, a front face 110a of the housing 110 is moved away from a base portion 110b of the housing 110 so that some of the internal components of the HMD 100 received in the housing 100 are visible. In some embodiments, the front face 110a of the housing 110 may be rotatably coupled to the base portion 110b of the housing 110 by hinges 110c or other rotation structure. In some embodiments, the front face 110a of the housing 110a may be removably coupled to the base portion 110b of the housing 110 by snap fit with clips or other coupling structure. In some embodiments, the front face 110a of the housing 110 may remain stationary with respect to the base portion 110b of the housing 110. A display 140 may be mounted on the front face 110a of the housing 110. In some embodiments, the display 140 may be included in a smartphone, or other mobile electronic device including a display screen, removably coupled to the front face 110a of the housing 110 by coupling device(s) 110d. In some embodiments, the display 140 may remain fixed in the housing 110 of the HMD 100.

Lenses 150, for example, a left lens aligned with the user's left eye and a right lens aligned with the user's right eye, may be mounted in the housing 110, between the user's eyes and the display 140 when the front face 110*a* is in the closed position against the base portion 110*b* of the housing 110. As shown in FIG. 1B, the display 140 is a single display that spans both of the lenses 150. In other words, rather than a display (e.g., side-by-side displays) dedicated to each of the lenses 150 (or lens system), the display 140 spans both lenses 150. A width of the display 140 may be greater than an inter-pupillary distance (IPD) of the viewer, so that the widest possible field of view is afforded to the viewer by the display 140, enhancing the immersive experience generated by the HMD 100. In some embodiments, the lenses 150 may be mounted in the housing 110 on an adjustable mounting structure 155, with a position of the lenses 150 adjusted by an adjustment device 158, either automatically or manually, so that the lenses 150 may be aligned with respective optical axes of the user's eyes to provide a relatively wide field of view and relatively short focal length.

Figure 3A:
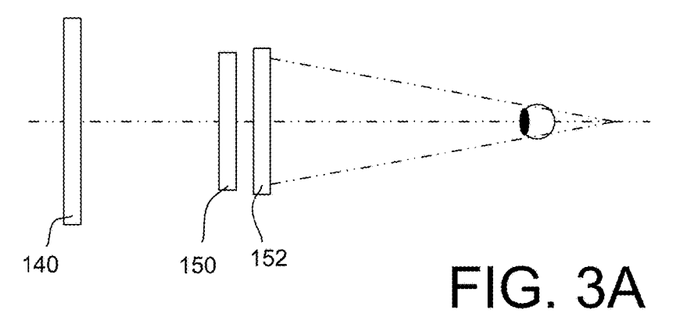
FIGS. 3A and 3B illustrate arrangements of optical components of and HMD, in accordance with embodiments as broadly described herein.
Figure 3B:
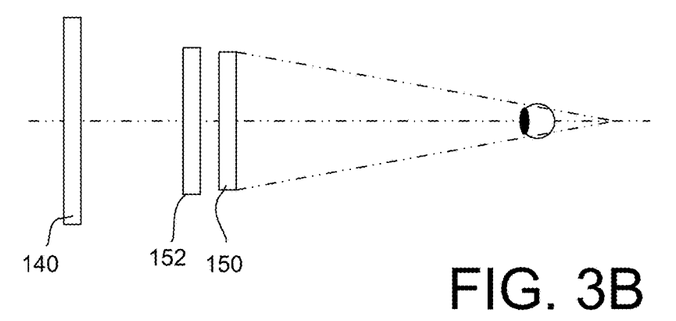

In some embodiments, active shutters 152 may be positioned adjacent to each of the lenses 150, for example, a left shutter 152L may be positioned adjacent to the left lens 150, and a right shutter 152R may be positioned adjacent to the right lens 150, to control the user's view through the respective lens 150. For example, in some embodiments, each active shutter 152 may be positioned (e.g., disposed) between the user's eye and the lens 150, as shown in FIG. 3A. In some embodiments, each active shutter 152 may be positioned (e.g., disposed) between the lens 150 and the display 140, as shown in FIG. 3B. In some embodiments, the arrangement of the active shutter 152R and lens 150 aligned with the user's right eye may be the same as the arrangement of the active shutter 152L and lens 150 aligned with the user's right eye. In some embodiments, the arrangement of the active shutter 152 and lens 150 aligned with the user's right eye may be different than the arrangement of the active shutter 152 and lens 150 aligned with the user's right eye.

The arrangement of elements shown in FIGS. 3A and 3B, and sizing of individual elements, are merely exemplary, and not to scale, and the elements are illustrated for clarity and ease of discussion. A size, or dimension, such as, for example, a diameter, of the active shutter 152 may be greater than or equal to a viewing cone of the user's eye, so that the active shutter 152 can substantially fully intercept the eye's view of the display 140 through the active shutter 152 and lens 150. Thus, a size of the active shutter 152 may be based on numerous factors, such as, for example, a size of the lens 150, a distance between the active shutter 152/lens 150 and the viewer's eye (taking into account the user's viewing cone), and other such factors. Accordingly, in some embodiments, a size, for example, a diameter of the active shutter 152 may be greater than or equal to a corresponding size, for example, diameter, of the corresponding lens 150. In some embodiments, a size of the active shutter 152 may be less than a corresponding size of the corresponding lens 150.

In some embodiments, the HMD 100 may include a sensing system 160 including various sensors 162 through 164 and a control system 170 including various control system devices, or modules 171 through 176 to facilitate automated control and manual user control of the HMD 100. The control system 170 may also include a processor 190 to control operation of the components of the control system 170, when operated manually or automatically, and also when operated in response to conditions detected/sensed by the sensing system 160 in response to a command received by the control system 170.

In some embodiments, the HMD 100 may include a camera 180 which may capture still and moving images of an ambient environment, outside of the virtual immersive environment generated by the HMD 100, and display these images of the ambient environment to the user on the display 140 in a pass through mode of the HMD 100. In the pass through mode, the user may be able to leave the virtual immersive experience generated by the HMD 100 and temporarily return to the real world without removing the HMD 100 or otherwise changing the physical configuration of the HMD 100 such as, for example, moving the housing 110 out of the line of sight of the user. In some embodiments, the display 140 may be a transparent display, allowing the user to view the real world environment through the display 140 in some modes of operation.

Separate, offset 2D images may be presented separately to the left and right eyes of the user, so that the left eye sees only images on the first display/section, and the right eye sees only images on the second display/section. These segregated 2D images may be unconsciously processed and combined by the brain to provide the perception of 3D depth in the combined image. In some implementations, the HMD may include multiple displays, for example, two displays, or a single display segregated into a first section, or subset of pixels, displaying images visible only to the left eye and a second section, or subset of pixels, dedicated to displaying images only to the right eye, or may alternately display images visible only by the left eye and only by the right eye. In some implementations, a panel may be positioned between the optical components for the left and right eyes, so that a first of the two displays/sections may be viewed only by the user's left eye, and a second of the two displays/sections may be viewed only by the user's right eye. In some implementations, the display may alternately display only left circularly polarized light and then right circularly polarized light, with passive left circular polarized film at the left lens allowing only the left circular polarized light images to be viewed by the left eye and passive right circular polarized film at the right lens allowing only right circular polarized light images to be viewed by the right eye.

In whatever manner these offset 2D images are generated and viewed, a user viewing a perceived 3D image generated in this manner may have a relatively limited field of view, due to the segregation of the display, and/or the physical barrier between the left and right optical components of the HMD. Additionally, in a case in which the display alternately displays left polarized light images and right polarized light images, some pixels or portions of the display are dedicated to displaying only left polarized light images, and the remaining pixels or portions of the display are dedicated to displaying only right polarized light images, effectively reducing resolution of any image displayed by the display by essentially half.

The example HMD 100 shown in FIGS. 1A and 1B includes a single display 140, without a physical barrier positioned between the lenses 150 which would preclude or limit visibility to certain portions of the display 140, or to different displays. In contrast to the relatively limited field of view available when partitioned by a physical barrier and/or separate displays, precise control of the active shutter 152 in coordination with images displayed on the display 140 in the arrangement shown in FIGS. 1A and 1B may allow for a relatively wide, immersive field of view without sacrificing display resolution, and while still generating the perception of 3D depth in an immersive experience, making use of essentially the full display area of the display 140 at full resolution of the display 140 with each image displayed.

Figure 2:
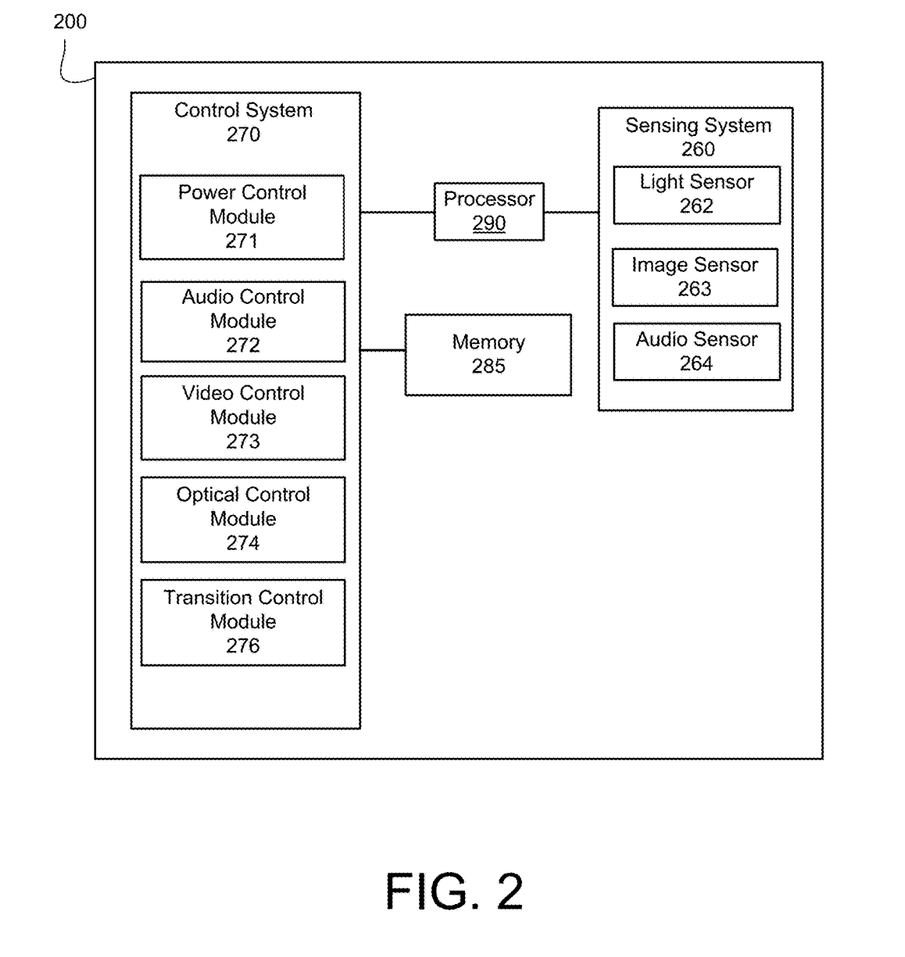
FIG. 2 is a block diagram of an example HMD, in accordance with embodiments as broadly described herein.

FIG. 2 is a block diagram of an example HMD 200 including an active shutter system, in accordance with embodiments as broadly described herein. The HMD 200 may include a sensing system 260 and a control system 270, which may be similar to the sensing system 160 and the control system 170 of the HMD 100 shown in FIGS. 1A and 1B. As shown in FIG. 2, the sensing system 260 may include a plurality of sensors, such as, for example, a light sensor 262, an image sensor 263 and an audio sensor 264. In some embodiments, the light sensor 262, image sensor 263 and audio sensor 264 may be included in one component, such as, for example, a camera, such as the camera 180 of the HMD 100 shown in FIGS. 1A and 1B. The control system 270 may include, for example, a power control module 271, audio and video control modules 272 and 273, an optical control module 274, and a transition control module 276. In some embodiments, the sensing system 260 and/or the control system 270 may include more, or fewer, devices and/or modules, depending on a particular implementation. The elements included in the sensing system 260 and/or the control system 270 may have a different physical arrangement (e.g., different physical location) within, for example, an HMD other than the HMD 100 shown in FIGS. 1A and 1B.

The control system 270 may coordinate control of the various audio and video elements of the HMD. For example, in some embodiments the optical control module 274 of the control system 270 may work in coordination with the video control module 273 so that an image displayed on the display for viewing only by the left eye is visible only by the left eye at a given time, as shown in FIG. 4A, and an image displayed on the display 140 for viewing only by the right eye is visible by the right eye at a given time, as shown in FIG. 4B, so that the desired 3D effect may be achieved. In some embodiments, this may be achieved by, for example, alternately activating the left shutter 152 and the right shutter 152 to alternately and rapidly block one eye and then the other eye, as shown in FIGS. 4A and 4B, so that only one eye is able to view the display 140 at a given time.

In some embodiments, both the left active shutter 152L (aligned along the optical axis of the left eye) and the right active shutter 152R (aligned along the optical axis of the right eye) may be made of a material that can transition between an opaque state and a transparent state, such as, for example, a polymer dispersed liquid crystal (PDLC) material. When powered off, this type of material may be opaque. When activated by light, liquid crystal droplets dispersed in the material may transmit through the material, causing the material to transition from an opaque state to a clear, or transparent state. In some embodiments, the left and right active shutters 152 may include, for example, a liquid crystal layer which may be transparent when de-activated, and which may become opaque when voltage is applied to the liquid crystal layer and is activated. This alternating actuation of the left and right active shutters 152 may be controlled by, for example, a timing signal generated by the optical control module in synchronization with, for example, a refresh rate of the display 140 controlled by the video control module of the control system.

Figure 4:
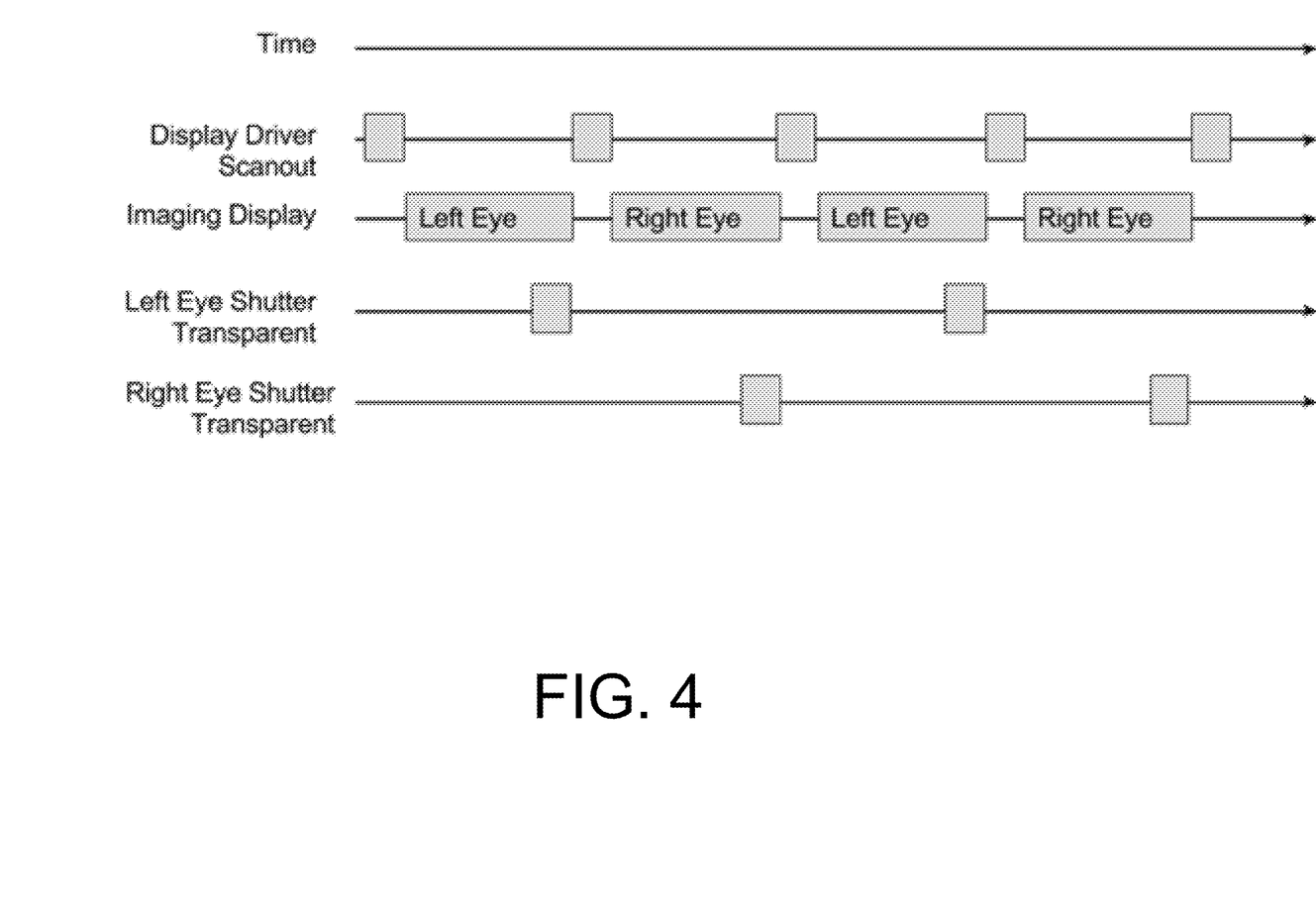
FIG. 4 illustrates timing and synchronization of left and right views of an HMD, in accordance with embodiments as broadly described herein.

An example of the timing and synchronization of the display 140 and the active shutters 152 is shown in FIG. 4. A display driver operated, for example, in the video control module of the control system as described above, may read a frame intended for viewing by the left eye and drive output to be displayed on the display 140. After the display 140 is fully illuminated with the content intended for viewing by the left eye, the left eye active shutter 152L may become transparent, allowing the image on the display 140 to be viewed by the left eye. At this point, the right active shutter 152R is in an opaque state, and the image on the display 140 is not visible by the right eye. Then display driver may read a subsequent frame, intended for viewing by the right eye, the left active shutter 152L may become opaque and the right active shutter 152L may become transparent, so that and the process repeats for the right eye. In some circumstances, the duration of time that each shutter is alternately transparent may have an effect on motion blur in the scene constructed by the images displayed on the display 140. In some embodiments, approximately 1-2 milliseconds of transparency per active shutter may alleviate motion blur.

Figure 5A:
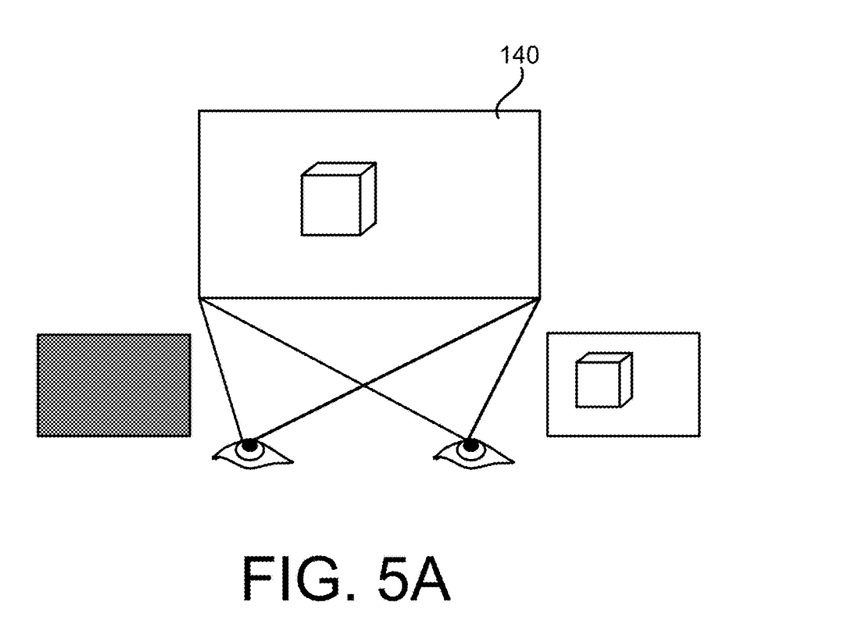
FIGS. 5A-5C illustrate right and left alternating views and a combined view on a display of an HMD, in accordance with embodiments as broadly described herein.
Figure 5B:
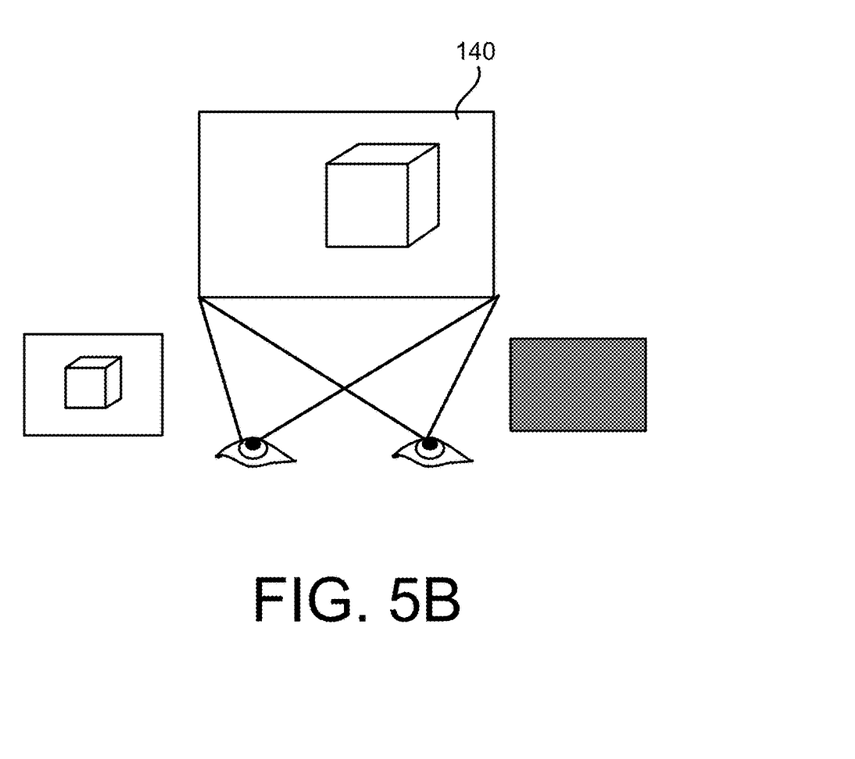
Figure 5C:
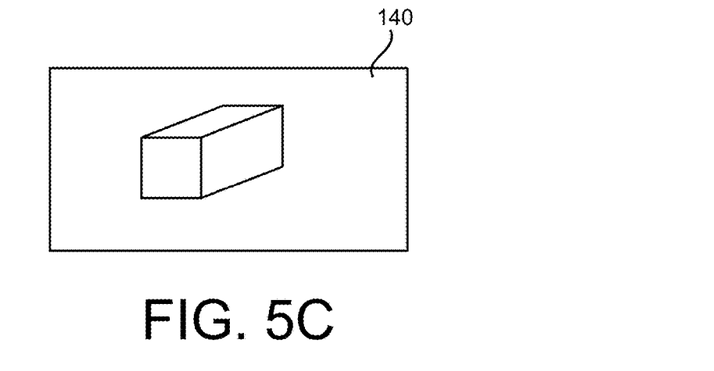

An example of the image viewed by the left eye, with the left shutter 152L in a transparent state and the right shutter 152R in an opaque state, or blocked, is shown in FIG. 5A. An example of the image viewed by the right eye, with the right shutter 152R in a transparent state and the left shutter 152L in an opaque state, or blocked, is shown in FIG. 5B. A recombination of the image viewed by the left eye and the image viewed by the right eye, is shown in FIG. 5C. As the alternate activation and de-activation of the left and right shutters 152 is accomplished at a rate that is imperceptible to the human eye, such as, for example, at a rate of approximately 120 Hz or greater, and the images viewed by the left eye and the images viewed by the right eye are quickly and unconsciously recombined by the brain, perception of a 3D image across essentially the full display area of the display 140 and at essentially full resolution of the display 140 may be achieved. That is, alternating control of the left and right active shutters 152, in synchronization with control of the images displayed on the display 140, in this manner may provide the user with the most expansive field of view possible for a given display 140 of the HMD 100, while also taking advantage of the full resolution of the display 140 with each image displayed to the user, regardless through which eye the image is viewed.

In general, as a separation distance between a display to be viewed by a user and the user's eyes decreases, viewing angles at left-most portions of the display and at right-most portions of the display become more acute. As these outer viewing angles become more acute, adjustments to the optical path between light rays generated by the display and received by the eye made by, for example, the lenses or the control of the images displayed on the display, may become more subject to attenuation, and difficult to correct.

In the example implementation shown in FIGS. 1A-1C, in which the display 140 is implemented in an HMD 100, a separation distance d between the display 140 and the user's eyes may be relatively close, and approaching a minimum separation at which images displayed on the display 140 are clearly perceptible. In the HMD 100, where the display 140 is very close to the user's eyes, with the lenses 150 and active shutters 152 positioned between the user's eyes and the display 140, a distance between the lenses 150 and the display 140 may be, for example, less than approximately 25 mm, depending on numerous factors such as, for example, an overall size of the HMD 100, size, spacing and optical characteristics of the lenses, and other such factors. Even at a nominal separation distance d between the lenses 150 and the display 140, a display area of the display 140 having a width W may be essentially fully visible to the user, with the distance d between the lenses 150 and the display 140 being less than the width W of the display area of the display 140.

In some embodiments, the display area of the display 140 may be essentially equal to the entire surface area of the display 140 facing the viewer.

Figure 6A:
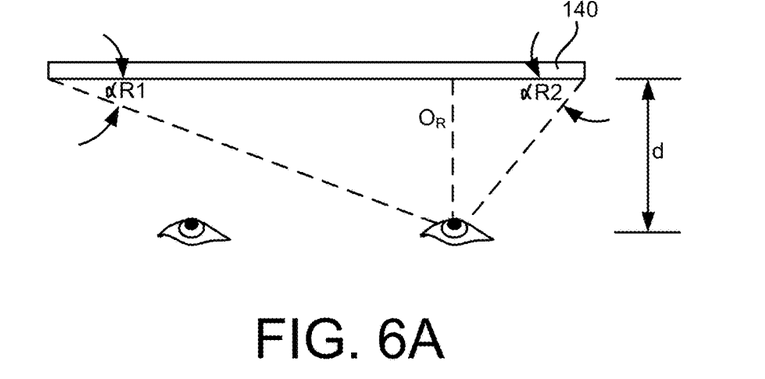
FIGS. 6A and 6B illustrate right and left viewing angles of a display of an HMD, in accordance with embodiments as broadly described herein.
Figure 6B:
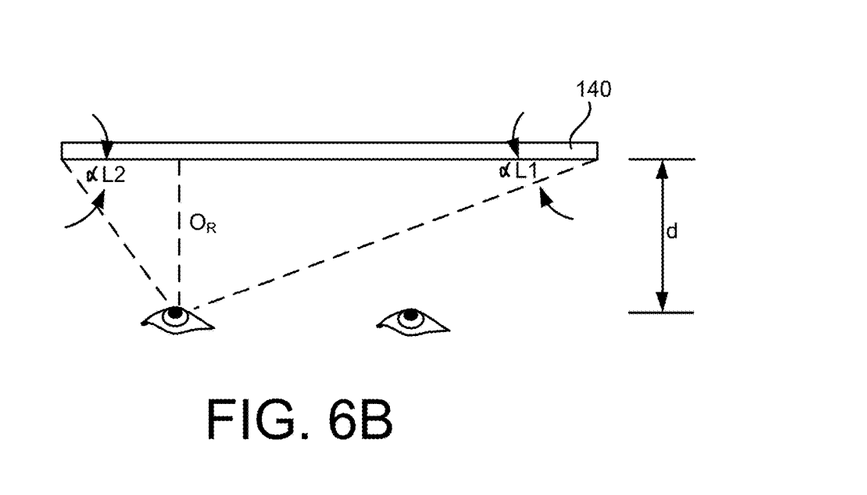

As shown in FIG. 6A, in this HMD type arrangement, an angle $α_{R1}$ at which a left-most portion of the display 140 is viewed by the right eye is relatively acute compared to an angle $α_{R2}$ at which a right-most portion of the display 140 is viewed by the right eye. That is, light rays generated by the display 140 at the left-most portion of the display 140 travel at a relatively acute angle (for example, with respect to the display 140) on a path towards the right eye. This angle becomes less acute when moving from the left-most portion of the display 140 towards the optical axis $O_R$ of the right eye. Similarly, as shown in FIG. 6B, an angle $α_{L1}$ at which the right-most portion of the display 140 is viewed by the left eye, or an angle at which light rays generated by the right-most portion of the display 140 travel toward the left eye, is relatively acute compared to an angle $α_{L2}$ at which the left-most portion of the display 140 is viewed by the left eye. This angle becomes less acute when moving from the right-most portion of the display 140 towards the optical axis $O_L$ of the left eye. This wide range of angles along which light rays generated by the display 140 (which could, in some arrangements, pose an image correction challenge) is accommodated by the use of the left and right active shutters 152, which have a relatively wide viewing cone, or field of view. The relatively wide viewing cone of the left and right active shutter 152 may allow substantially the entire display area of the display 140 to be captured and visible to the user through the active shutter 152 and lens 150. For example, in some embodiments, the viewing cone of the active shutter 152 may be as much as approximately 160 degrees. In some embodiments, the viewing cone of the active shutter 152 may be greater than 160 degrees. Although the left lens 150, left active shutter 152, right lens 150 and right active shutter 152 are not shown in the diagrams shown in FIGS. 6A and 6B, simply for ease of illustration, the relatively wide viewing cone, or field of view of the active shutters 152 may allow essentially all of the display area of the display 140 to be visible through a respective active shutter 152 and lens 150 pairing.

Figure 7:
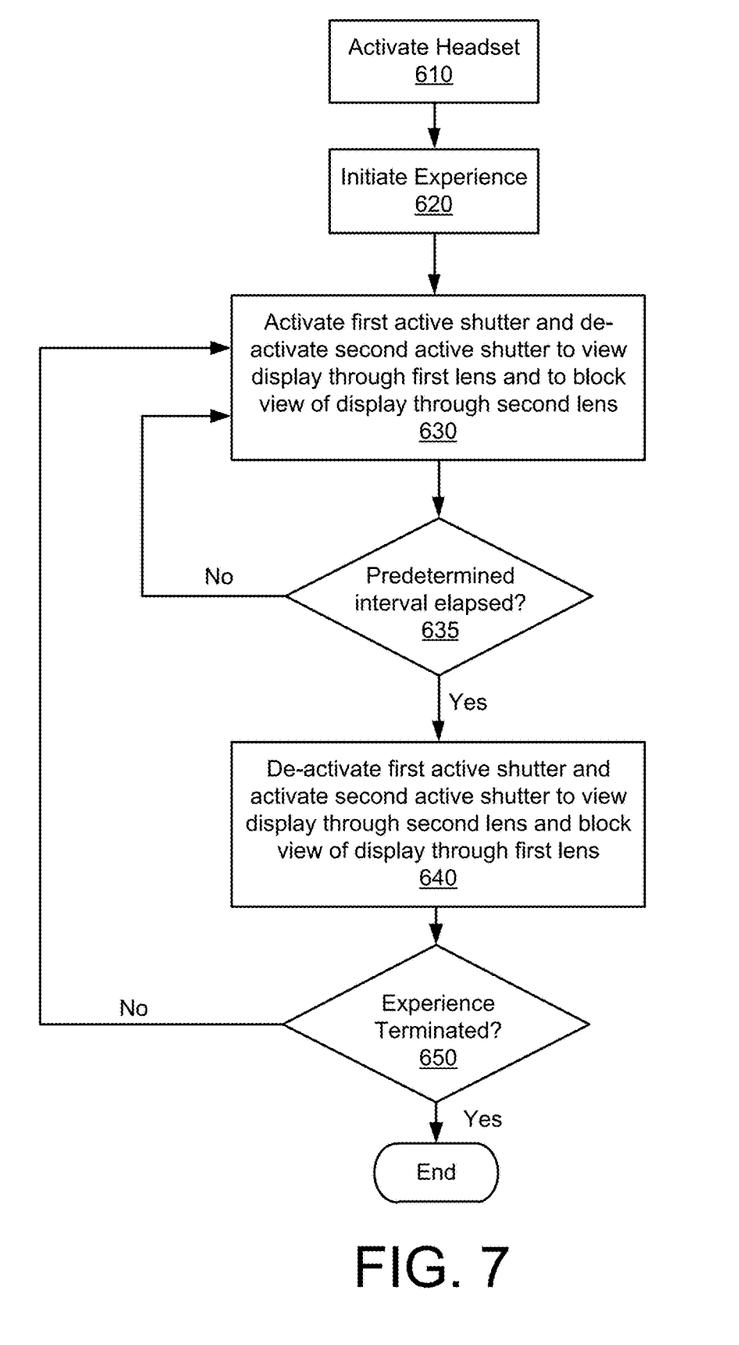
FIG. 7 is a flowchart of a method of operating an HMD, in accordance with embodiments as broadly described herein.

A method of operating an HMD, such as, for example, the HMD 100 shown in FIGS. 1A-1C, as embodied and broadly described herein, is shown in FIG. 7. First, the HMD 100 may be activated and an experience, such as, for example, a 3D immersive experience including, for example a 3D video experience, either alone or coupled with an audio experience, may be initiated, at blocks 610 and 620. The first active shutter and the second active shutter may then be alternately activated and de-activated, at blocks 630 and 640, so that the display area of the display is alternately visible through the first active shutter and first lens, with the second lens blocked, and then visible through the second active shutter and the second lens, with the first lens blocked.

For example, the HMD may be controlled so that, in a first mode (block 630), with the first active shutter activated and in a transparent state, and the second active shutter deactivated and in an opaque state, the display area of the display is visible only by the first eye of the user through the first active shutter and the first lens, while the second active shutter blocks the second eye's view of the display. After a predetermined interval of time has elapsed, at block 635, the HMD may be controlled in a second mode, at block 640. The predetermined interval of time may correspond to, for example, an interval synchronized with content to be displayed by the display area of the display, and intended for either the first eye or the second eye. In the second mode (block 640), with the second active shutter activated and in a transparent state, and the first active shutter deactivated and in an opaque state, the display area of the display is visible only by the second eye of the user through the second active shutter and the second lens, while the first active shutter blocks the first eye's view of the display.

Operation continuously switches between the first mode (block 630) and the second mode (block 640) until it is determined, at block 650, that the experience has been terminated.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A head mounted display (HMD) device, comprising:
a frame;
a housing coupled to the frame;
a single display disposed in the housing, the single display having an interior facing side defining a display area, the display area extending continuously from a left end portion of the single display to a right end portion of the single display, and from a top end portion of the single display to a bottom end portion of the single display;
a first lens mounted in the housing, positioned on the interior facing side of the single display, aligned along a first optical axis;
a second lens mounted in the housing, positioned on the interior facing side of the single display, aligned along a first second optical axis;
a first active shutter disposed in the housing, wherein the first active shutter is aligned along the first optical axis, and is positioned on the interior facing side of the single display;
a second active shutter disposed in the housing, wherein the second active shutter is aligned along the second optical axis, and is positioned on the interior facing side of the single display; and
a controller configured to alternately switch the first active shutter and the second active shutter between a first mode and a second mode, wherein,
in the first mode, the display area of the single display is fully visible through the first lens and the first active shutter, and
in the second mode, the display area of the single display is fully visible through the second lens and the second active shutter.

2. The device of claim 1, wherein, in the first mode,
the first active shutter is activated and in a transparent state such that the display area of the single display is fully visible through the first lens and the first active shutter, and
the second active shutter is deactivated such that the second active shutter blocks visibility of the display area of the single display through the second lens.

3. The device of claim 2, wherein, in the second mode,
the second active shutter is activated and in a transparent state such that the display area of the single display is fully visible through the second lens and the second active shutter, and
the first active shutter is deactivated such that the first active shutter blocks visibility of the display area of the single display through the first lens and the first active shutter.

4. The device of claim 1, wherein a resolution level of images displayed on the display area in the first mode is substantially equal to a full resolution level of the single display, and a resolution level of images displayed on the display area in the second mode is substantially equal to the full resolution level of the single display.

5. The device of claim 1, wherein, in alternately switching between the first mode and the second mode, the controller is configured to control a display of images on the display such that the display of images on the display is synchronized with the alternating activation of the first active shutter and the second active shutter.

6. The device of claim 1, wherein the first active shutter and the second active shutter each include a polymer dispersed liquid crystal material such that, in a de-activated state of the first active shutter, the first active shutter is opaque, and, in a de-activated state of the second active shutter, the second active shutter is opaque.

7. The device of claim 6, wherein the first active shutter transitions to transparent in response to activation of the polymer dispersed liquid crystal material of the first active shutter, and the second active shutter transitions to transparent in response to activation of the polymer dispersed liquid crystal material of the second active shutter.

8. The device of claim 1, wherein the first active shutter and the second active shutter each include a liquid crystal layer such that, in a de-activated state of the first active shutter, the first active shutter is transparent, and, in a de-activated state of the second active shutter, the second active shutter is transparent.

9. The device of claim 8, wherein the first active shutter transitions to opaque in response to activation by an electrical signal applied to the liquid crystal layer of the first active shutter, and the second active shutter transitions to opaque in response to activation by an electrical signal applied to the liquid crystal layer of the second active shutter.

10. The device of claim 1, wherein the first lens and the first active shutter are aligned along the first optical axis, the second lens and the second active shutter are aligned along the second optical axis, and the display is aligned with both the first optical axis and the second optical axis.

11. The device of claim 10, wherein the first lens is positioned between the first active shutter and the display, and the second lens is positioned between the second active shutter and the display.

12. The device of claim 10, wherein the first active shutter is positioned between the first lens and the display, and the second active shutter is positioned between the second lens and the display.

13. A method of operating a head mounted display (HMD) device, the method comprising:
activating a single display of the HMD, the single display having a display area extending continuously from a left end portion of the display to a right end portion of the display, and from a top end portion of the display to a bottom end portion of the display, and displaying images on the display area of the single display, the images displayed on the display area of the single display being selectively visible through an active shutter system and lens system, including:
a first active shutter and a first lens aligned along a first optical axis, with the first active shutter and the first lens positioned between the single display and a first eye of the user; and
a second active shutter and a second lens aligned along a second optical axis, with the second active shutter and the second lens positioned between the single display and a second eye of the user; and
switching the active shutter system between a first mode and a second mode based on the images displayed on the display area of the single display, wherein,
in the first mode, the display area of the single display is fully visible through the first lens and the first active shutter as the images are displayed on the display area of the single display; and
in the second mode, the display area of the single display is fully visible through the second lens and the second active shutter as the images are displayed on the display area of the single display.

14. The method of claim 13, wherein switching the active shutter system between the first mode and the second mode based on the images displayed on the display area of the single display also includes:
alternately and continuously switching between the first mode and the second mode until a predetermined operation period has elapsed.

15. The method of claim 13, wherein switching the active shutter system between the first mode and the second mode based on the images displayed on the display area of the single display also includes:
synchronizing the switching between the first mode and the second mode with the images displayed on the display area of the single display.

16. The method of claim 13, the first mode including activating the first active shutter and de-activating the second active shutter, including:
applying a signal to the first active shutter to activate the first active shutter and transitioning the first active shutter to an opaque state, visibility of the display area of the single display being blocked by the first active shutter in the activated state; and
terminating a signal to the second active shutter to de-activate the second active shutter and transitioning the second active shutter to a transparent state, the display area of the single display being fully visible through the second active shutter and the second lens with the second active shutter in the de-activated state.

17. The method of claim 16, the second mode including de-activating the first active shutter and activating the second active shutter, including:
applying a signal to the second active shutter to activate the second active shutter and transitioning the second active shutter to an opaque state, visibility of the display area of the single display being blocked by the second active shutter in the activated state; and
terminating a signal to the first active shutter to de-activate the first active shutter and transitioning the first active shutter to a transparent state, the display area of the single display being fully visible through the first active shutter and the first lens with the first active shutter in the de-activated state.

18. The method of claim 13, wherein displaying images on the display area of the single display includes displaying images on the display area in the first mode at a resolution level that is substantially equal to a full resolution level of the single display, and displaying images on the display area at a resolution level that is substantially equal to the full resolution level of the single display.

19. A computer program product embodied on a non-transitory computer readable medium, the computer readable medium having stored thereon a sequence of instructions which, when executed by a processor, causes the processor to execute a method, the method comprising:
activating a single display of a head mounted display (HMD) device, the single display having a display area extending continuously from a left end portion of the display to a right end portion of the display, and from a top end portion of the display to a bottom end portion of the display, and displaying images on the display area of the single display, the images displayed on the display area of the single display being selectively visible through an active shutter system and lens system, including:
a first active shutter and a first lens aligned along a first optical axis, with the first active shutter and the first lens positioned between the single display and a first eye of the user; and
a second active shutter and a second lens aligned along a second optical axis, with the second active shutter and the second lens positioned between the single display and a second eye of the user; and
switching the active shutter system between a first mode and a second mode based on the images displayed on the display area of the single display, wherein,
in the first mode, the display area of the single display is fully visible through the first lens and the first active shutter as the images are displayed on the display area of the single display; and
in the second mode, the display area of the single display is fully visible through the second lens and the second active shutter as the images are displayed on the display area of the single display.

20. The computer program product of claim 19, further comprising:
alternately and continuously switching between the first mode and the second mode until a predetermined operation period has elapsed,
the first mode including activating the first active shutter and de-activating the second active shutter, including:
applying a signal to the first active shutter to activate the first active shutter and transitioning the first active shutter to an opaque state, visibility of the display area of the single display being blocked by the first active shutter in the activated state; and
terminating a signal to the second active shutter to de-activate the second active shutter and transitioning the second active shutter to a transparent state, the display area of the single display being fully visible through the second active shutter and the second lens with the second active shutter in the de-activated state, and the second mode including de-activating the first active shutter and activating the second active shutter, including:
   applying a signal to the second active shutter to activate the second active shutter and transitioning the second active shutter to an opaque state, visibility of the display area of the single display being blocked by the second active shutter in the activated state; and
   terminating a signal to the first active shutter to de-activate the first active shutter and transitioning the first active shutter to a transparent state, the display area of the single display being fully visible through the first active shutter and the first lens with the first active shutter in the de-activated state.

* * * * *

UNITED STATES PATENT AND TRADEMARK OFFICE
CERTIFICATE OF CORRECTION

PATENT NO. : 9,936,194 B2
APPLICATION NO. : 14/725607
DATED : April 3, 2018
INVENTOR(S) : Stein Page 1 of 1

It is certified that error appears in the above-identified patent and that said Letters Patent is hereby corrected as shown below:

In the Claims

In Column 9, Line 50, Claim 1, delete "first second" and insert -- first --, therefor.

Signed and Sealed this
Tenth Day of December, 2019

Andrei Iancu
*Director of the United States Patent and Trademark Office*